(12) United States Patent
Dally

(10) Patent No.: US 9,484,815 B2
(45) Date of Patent: Nov. 1, 2016

(54) ENERGY-BASED CONTROL OF A SWITCHING REGULATOR

(71) Applicant: NVIDIA Corporation, Santa Clara, CA (US)

(72) Inventor: William J. Dally, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 63 days.

(21) Appl. No.: 14/055,819

(22) Filed: Oct. 16, 2013

(65) Prior Publication Data

US 2015/0102788 A1 Apr. 16, 2015

(51) Int. Cl.
*H02M 3/158* (2006.01)
*H02M 3/156* (2006.01)

(52) U.S. Cl.
CPC ............ *H02M 3/158* (2013.01); *H02M 3/156* (2013.01); *H02M 2003/1566* (2013.01)

(58) Field of Classification Search
CPC ...... H02M 3/158; H02M 3/156; H02M 1/00; H02M 2003/1566; G05F 1/10; H05F 1/56
USPC ......................................... 323/271, 285, 224
See application file for complete search history.

(56) References Cited

U.S. PATENT DOCUMENTS

| | | | | |
|---|---|---|---|---|
| 6,924,993 B2 * | 8/2005 | Stancu | ............... | H02M 7/53875 323/908 |
| 2004/0000895 A1 * | 1/2004 | Solivan | ......................... | 323/271 |
| 2004/0057257 A1 * | 3/2004 | Sarlioglu et al. | ............... | 363/49 |
| 2011/0169474 A1 * | 7/2011 | Cuk | ...................... | H02M 3/158 323/311 |
| 2011/0227413 A1 * | 9/2011 | Tsai | .......................... | H02J 1/10 307/43 |
| 2012/0074924 A1 * | 3/2012 | Dequina | ............... | H02M 3/156 323/351 |
| 2012/0194152 A1 * | 8/2012 | Martinelli | ............. | H02M 3/158 323/282 |
| 2012/0242314 A1 * | 9/2012 | Namekawa et al. | .......... | 323/283 |
| 2012/0277831 A1 * | 11/2012 | Joshi | .................. | A61N 1/37223 607/62 |

OTHER PUBLICATIONS

Billings, K. et al., "Switchmode Power Supply Handbook," Third Edition, McGraw-Hill, 2011, pp. 2.163-2.169, pp. 2.175-2.176, pp. 3.119-3.155.
Redl, R. et al., "Ripple-Based Control of Switching Regulators—An Overview," IEEE Transactions on Power Electronics, vol. 24, No. 12, Dec. 2009, pp. 2669-2680.
Yousefzadeh, V. et al., "Proximate Time-Optimal Digital Control for Synchronous Buck DC—DC Converters," IEEE Transactions on Power Electronics, vol. 23, No. 4, Jul. 2008, pp. 2018-2026.

\* cited by examiner

*Primary Examiner* — Jessica Han
*Assistant Examiner* — Demetries A Gibson
(74) *Attorney, Agent, or Firm* — Zilka-Kotab, PC

(57) ABSTRACT

A system and method are provided for controlling a switching voltage regulator circuit. An energy difference between a stored energy of a switching voltage regulator and a target energy is determined. A control variable of the switching voltage regulator is computed based on the energy difference and the control variable is applied to a current control mechanism of the switching voltage regulator. In one embodiment, the control variable is pulse width of a control signal.

20 Claims, 13 Drawing Sheets

ENERGY-BASED CONTROL OF A SWITCHING REGULATOR

FIELD OF THE INVENTION

The present invention relates to regulator circuits, and more specifically to controlling switching regulator circuits.

BACKGROUND

Conventional devices such as microprocessors and graphics processors that are used in high-performance digital systems may have varying current demands based on the processing workload. For example, current demands may increase dramatically when a block of logic is restarted after a stall or when a new request initiates a large computation such as the generation of a new image. Conversely, current demands may decrease dramatically when a block of logic becomes idle. When the current demand increases and sufficient power or energy is not available, the supply voltage that is provided to the device may drop below a critical voltage level, potentially causing the device to fail to function properly. When the current demand decreases and the supply voltage that is provided to the device rises above a critical voltage level, circuits within the device may fail to function properly and may even be destroyed.

A conventional switching regulator is an electric power conversion device that interfaces between a power supply and a device, providing current to the device and responding to changes in current demands to maintain a supply voltage level. Conventional voltage regulators used for central processing units (CPUs) and graphics processing units (GPUs) convert 12 Volts to approximately 1 Volt using a "buck" converter. Switches of the buck converter are typically controlled with proportional integral derivative (PID) technique to modulate a pulse width during which a high-side switch is coupled to the 12 Volt power supply to provide current to the device. While a conventional buck converter is simple to operate and requires only a few components (i.e., two switches, a filter capacitor, and an inductor), a conventional buck converter controlled using the PID technique may take longer than desired to respond to current demand transients of the device, resulting in a drop in supply voltage, so that the supply voltage that is provided to the device may drops below the critical voltage level.

FIG. 1 illustrates voltage and current waveforms 100 showing a conventional buck converter controlled using the PID technique, in accordance with the prior art. A first waveform corresponds to the current $i_L$ in the inductor of the converter. A second waveform corresponds to the voltage $v_C$ at the filter capacitor. A third waveform corresponds to the width of the pulse $t_a$ during which the high-side switch is enabled. A PID controller responds to load current transients of +5 Amps at 100 μs and −3 Amps at 400 μs by increasing or decreasing $t_a$, respectively. As FIG. 1 shows, the PID controller takes about five 10 μs cycles to pump up current in the inductor and then additional cycles are required to raise the voltage $v_C$ on the filter capacitor. The peak drop of $v_C$ is 90 mV 30 μs after the transient. The response time of the PID controller should be reduced to better regulate the voltage level $v_C$.

Thus, there is a need for improving regulation of voltage levels and/or other issues associated with the prior art.

SUMMARY

A system and method are provided for controlling a switching voltage regulator circuit. An energy difference between a stored energy of a switching voltage regulator and a target energy is determined. A control variable of the switching voltage regulator is computed based on the energy difference and the control variable is applied to a current control mechanism of the switching voltage regulator. In one embodiment, the control variable is pulse width of a control signal.

DETAILED DESCRIPTION

An alternate energy-based strategy may be used for controlling a switching voltage regulator circuit and regulate a voltage level provided to a device. A pulse width of a high-side switch may be calculated to produce a total energy that is stored in the switching voltage regulator circuit. The pulse width is calculated to maintain a target energy that corresponds to a target voltage level to be provided to the device. When the voltage provided to the device drops below a critical level the controller adjusts the pulse width so that the voltage may be corrected in a single control cycle. The controller need not wait for the next control cycle to adjust the pulse with, but may increase the length of or initiate the next pulse immediately based on the amount of voltage drop. Therefore, the response time of the switching voltage regulator circuit is reduced and significant voltage drop is avoided.

Figure 2A:
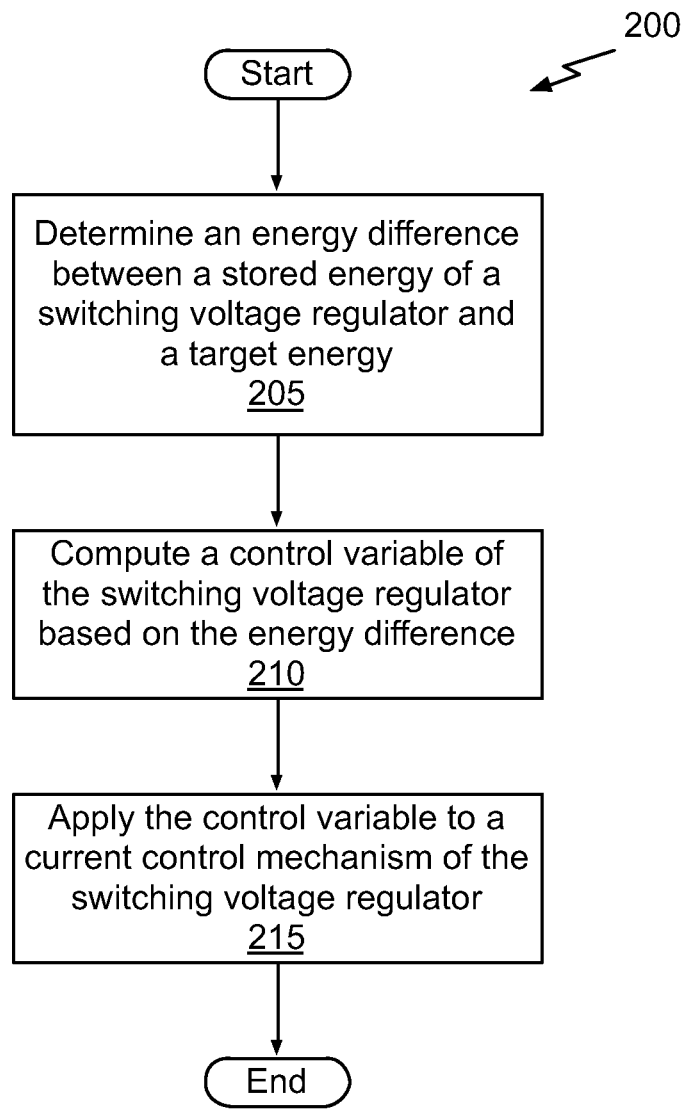
FIG. 2A illustrates a flowchart of a method for energy-based control of a switched regulator, in accordance with one embodiment.

FIG. 2A illustrates a flowchart of a method for energy-based control of a switched regulator, in accordance with one embodiment. At step 205, an energy difference between a stored energy of a switching voltage regulator and a target energy is determined. In one embodiment, the target energy corresponds to a target voltage level that is provided by the switching voltage regulator to a load. At step 210, a control variable of the switching voltage regulator is computed based on the energy difference. At step 215, the control variable is applied to a current control mechanism of the switching voltage regulator. In one embodiment, the control variable is a pulse width of a control signal, and the pulse width is applied to a high-side switch of the current control mechanism.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2B:
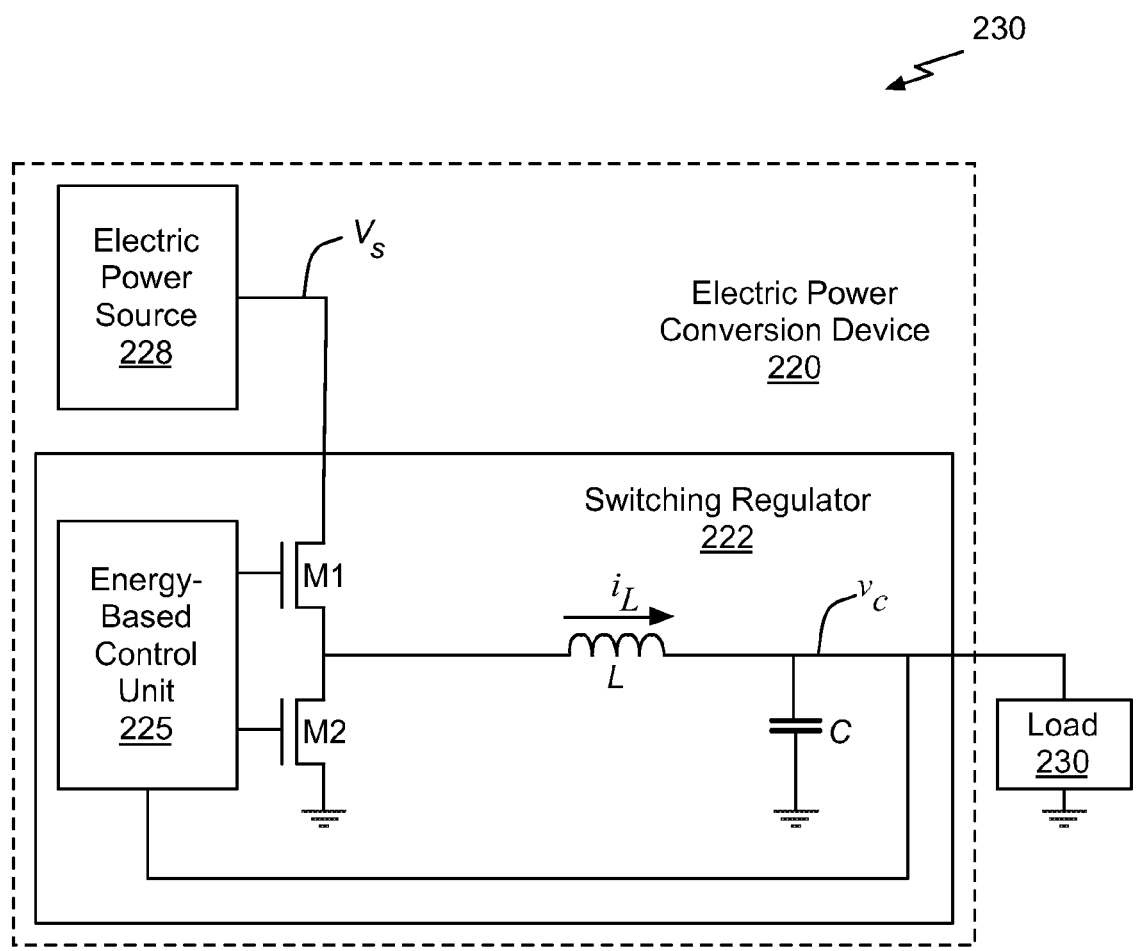
FIG. 2B illustrates a electric power conversion system including an electric power conversion device implemented using an energy-based controlled switching regulator, in accordance with one embodiment.

FIG. 2B illustrates an electric power conversion system 230 including an electric power conversion device 220 that is implemented as an energy-based controlled switching regulator 222, in accordance with one embodiment. The electric power conversion device 220 is configured to provide a desired output voltage level ($v_c$) at the load 230 by converting power received from an electric power source 228 (e.g., 12V). The configuration of the electric power source 228, the energy-based control unit 225, the switching devices M1 and M2, and the inductor L shown in FIG. 2B is typically referred to as a "buck" regulator (or converter).

The switching regulator 222 includes a current control mechanism (i.e., switching mechanisms M1 and M2). The current control mechanism is coupled to the electric power source 228 and the energy-based control unit 225 and is operable to control the current $i_L$ flowing through the inductor L. The arrow indicates the flow of current $i_L$ in the positive direction from an upstream end of the inductor L to a downstream end of the inductor L. For example, as illustrated, the current control mechanism may include one or more first switching mechanisms M1 and one or more second switching mechanisms M2. The switching mechanisms M1 and M2 may each include, for example, N-type power MOSFETs (metal oxide semiconductor field-effect transistor), and/or other switching mechanisms. In one embodiment, the switching mechanism M1 is a P-type power MOSFET. Although single switching mechanisms M1 and M2 are illustrated for the ease of understanding, it will be appreciated that a plurality of switching mechanisms M1 and M2 may be connected in parallel to increase current capacity, decrease conduction losses, and the like. In one embodiment, multiple switching regulators 222 may be configured to share a common capacitor, with each switching regulator 222 corresponding to one phase of a multi-phase electric power conversion system, as described in further detail in conjunction with FIG. 4.

The energy-based control unit 225 is configured to apply one or more control signals to the switching mechanisms M1 and M2. For example, the energy-based control unit 225 may be configured to generate pulse width modulation (PWM) signals or pulse frequency modulation (PFM) signals, a combination of PWM and PFM, and/or different control signals to selectively enable the switching mechanisms M1 and M2 according to a duty factor having a corresponding pulse width. In one embodiment, the energy-based control unit 225 is configured to generate control signals to selectively enable the switching mechanisms M1 and M2 with a pulse width that is based on a calculated energy difference. Regardless of the specific configuration, the energy-based control unit 225 is configured to provide control signals such that the switching mechanisms M1 and M2 are not concurrently enabled (i.e., turned on). In other words, only one of switching mechanism M1 and M2 is enabled at a time. Enabling switching mechanisms M1 and M2 concurrently provides a direct path between the supply of electric power source 228 and ground, thereby potentially damaging the electric power conversion device 220 and/or the load 230 and/or resulting in undesirable high power usage.

The energy-based control unit 225 may be configured to operate the current control mechanism so that each control cycle an amount of energy needed to maintain a target voltage at $v_c$ is stored in the inductor $i_L$ and the capacitor C. When the current demand at the load 230 changes (i.e., not steady-state operation), the switching mechanisms M1 and M2 may be controlled to quickly respond to the change in current demand by increasing or decreasing the amount of the current $i_L$ that is provided to L. When a multi-phase switching regulator is implemented, where each buck regulator including an energy-based control unit 225 corresponds to one of the phases, one or more phases may be enabled or disabled as the output voltage $v_c$ at the load 230 changes.

At any point in time the energy stored in the switching regulator 222, $E_R$, is given by $$E_R = \frac{1}{2}(i_x^2 L + v_C^2 C), \tag{1}$$

where $i_x = i_L - i_{Load}$ is the excess inductor current and $v_C$ is the voltage across capacitor C. At the target state, target output voltage $V_T$ and zero excess current ($i_x = 0$), the target energy is $$E_T = \frac{1}{2}(V_T^2 C) \tag{2}$$

The energy deficit, the required change in energy needed to reach to the target energy, $E_T$, is $$\Delta E = E_T - E_R. \tag{3}$$

The energy-based control unit 225 calculates a pulse width needed to correct the energy deficit $\Delta E$ and corrects the energy deficit in a single pulse. For a pulse of width $t_P$ the excess current at the end of the pulse, $I_{xP}$, is $$I_{xP} = I_{x0} + \frac{(V_S - v_C)t_P}{L}. \tag{4}$$

The change in energy over the width of the pulse is computed by integrating the power out of the electric power source 228 during the pulse width, where $L_{x0}$ is the excess current at the start of the pulse.

$$\Delta E = t_P V_S \left( I_{x0} + \frac{I_{xP} - I_{x0}}{2} \right). \tag{5}$$

Substituting equation (4) into equation (5) for $I_{xP}$ and replacing $t_P$ with $t_C D$, where $t_C$ is the period of the control cycle and D is the duty factor of the control signal that enables and disables the high-side switch M1, gives:

$$\Delta E = t_C D V_S \left( I_{x0} + \frac{(V_S - v_C) t_C D}{2L} \right). \tag{6}$$

Equation (5) is then expressed in a different form as $$\Delta E = (t_C V_S I_{x0}) D + \left( \frac{V_S (V_S - v_C) t_C^2}{2L} \right) D^2 \tag{7}$$

For a specific $\Delta E$ the resulting quadratic equation:

$$\left( \frac{V_S (V_S - v_C) t_C^2}{2L} \right) D^2 + (t_C V_S I_{x0}) D + (-\Delta E) = 0, \tag{8}$$

can be solved for the required duty factor D. The input values that are used to solve the quadratic equation include $\Delta E$, $I_{x0}$, and $v_C$. $I_{x0}$ is the excess current at the beginning of the operating cycle that may be estimated by sampling $i_x$, the instantaneous excess inductor current. The current $i_x$ may be provided by a current sensor. Alternatively, $i_x$ may be estimated using the sensed voltage, $v_C$ and computing the derivative of $v_C$.

Figure 2C:
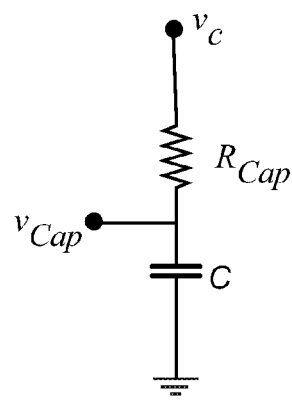
FIG. 2C illustrates a model of the capacitor that may be used to estimate the instantaneous excess current, in accordance with one embodiment.

FIG. 2C illustrates a model of the capacitor of FIG. 2B that may be used to estimate the instantaneous excess current, in accordance with one embodiment. As shown in FIG. 2C, $v_C = v_{Cap} + R_{Cap} i_x$, $R_{Cap}$ is the equivalent series resistance (ESR) of the capacitor C and $v_{Cap}$ is the voltage across the capacitor C when the resistance is modeled as being coupled between the capacitor C and the downstream terminal of the inductor L that is at voltage $v_C$. When an estimate of $i_x$ is determined, $v_{Cap} = v_C - R_{Cap} i_x$ may be used in place of $v_c$ to solve equation (8).

The calculated duty factor is then limited to fall in the range $[0 \, D_{max}]$ where $D_{max} < 1$ is the maximum duty factor. When the value of D is not limited, the energy deficiency may be corrected by a single pulse of width $t_p$. In one embodiment, the energy-based control unit 225 enables the switching device M1 during the pulse of width $t_p$. The width of the pulse $t_p$ that enables the pull-up switching mechanism determines the current $i_L$ delivered to the load 230.

Figure 1:
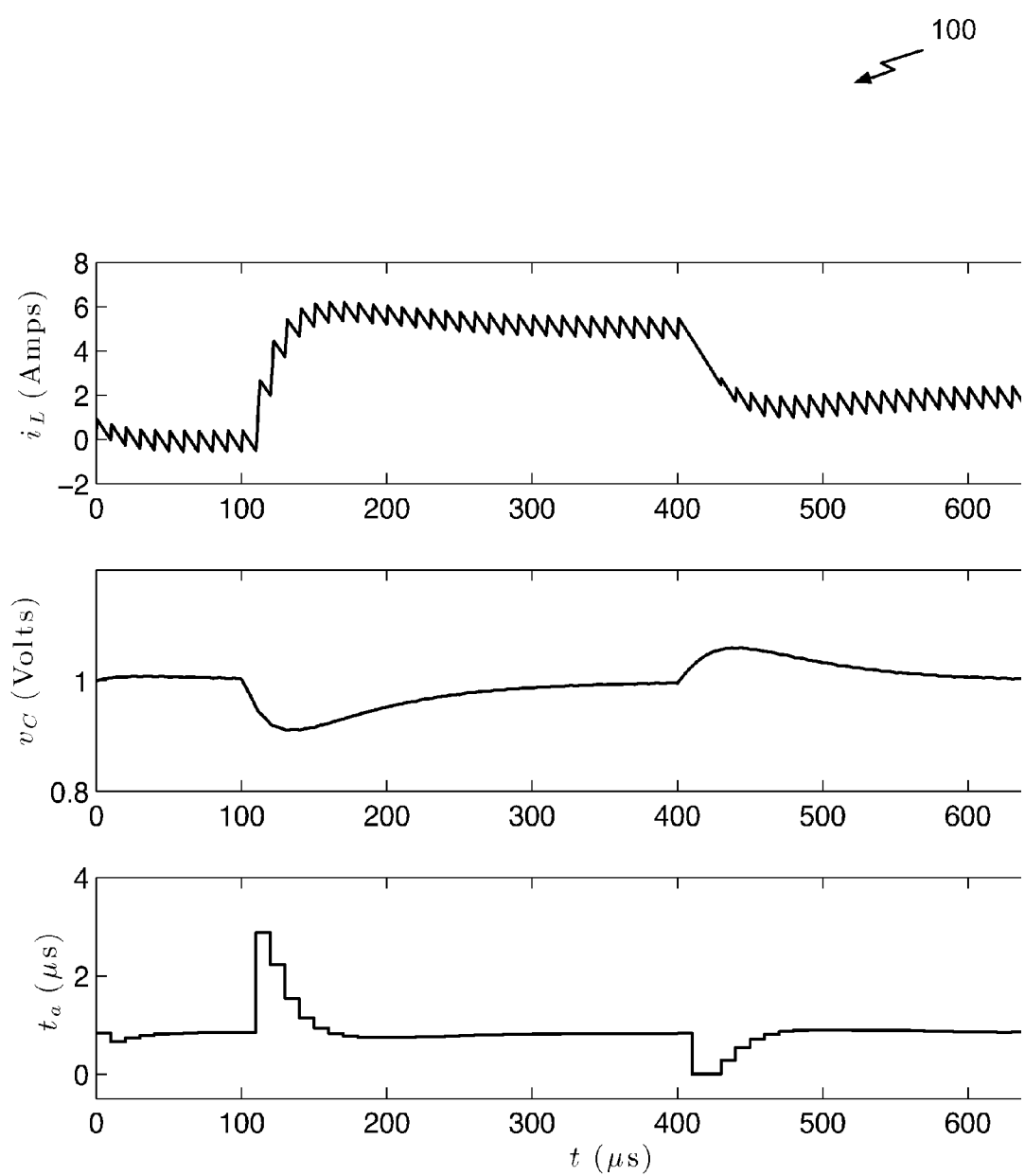
FIG. 1 illustrates voltage and current waveforms showing a conventional buck converter controlled using the PID technique, in accordance with the prior art.
Figure 2D:
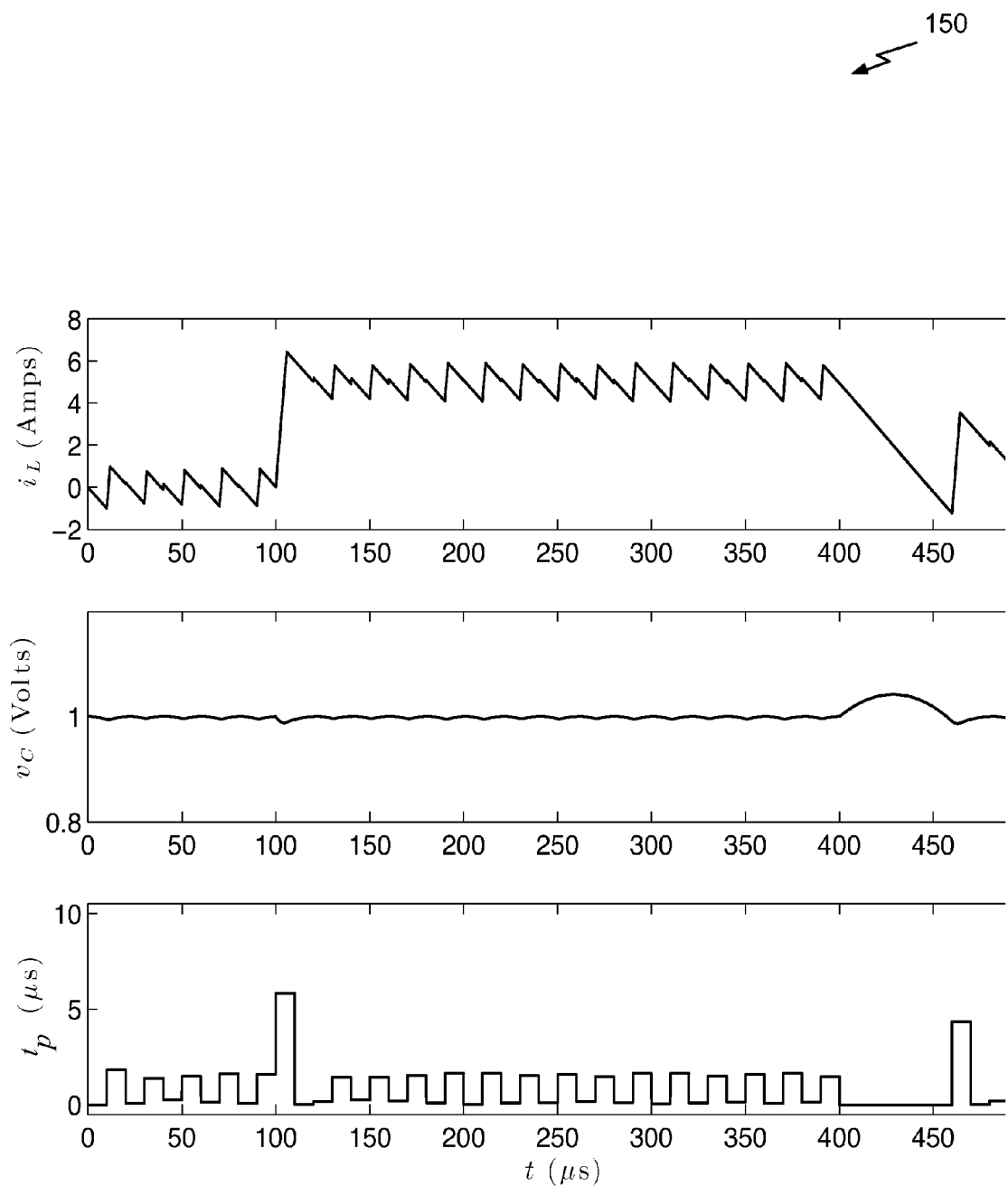
FIG. 2D illustrates voltage and current waveforms showing energy-based control of the switching regulator shown in FIG. 2B, in accordance with one embodiment.

FIG. 2D illustrates voltage and current waveforms 150 showing energy-based control of the switching regulator 222 shown in FIG. 2B, in accordance with one embodiment. A first waveform corresponds to the current $i_L$ at the load 230. A second waveform corresponds to the voltage $v_C$ across the filter capacitor C. A third waveform corresponds to the width of the pulse $t_p$ during which the high-side switching mechanism M1 is enabled by the energy-based control unit 225. The energy-based control unit 225 responds to current transients on $i_L$ of +5 Amps at 100 μs and −3 Amps at 400 μs by increasing or decreasing $t_p$, respectively. As FIG. 2D shows, the energy-based control unit 225 generates signals that control the current control mechanism to correct an energy deficit in a single control cycle. The peak drop is reduced from 90 mV to 14 mV compared with the prior art controller described in conjunction with FIG. 1. However, because the energy-based control unit 225 is regulating total energy rather than the voltage $v_C$, the current ripple and voltage ripple may be higher than when a PID control technique is used.

Figure 3A:
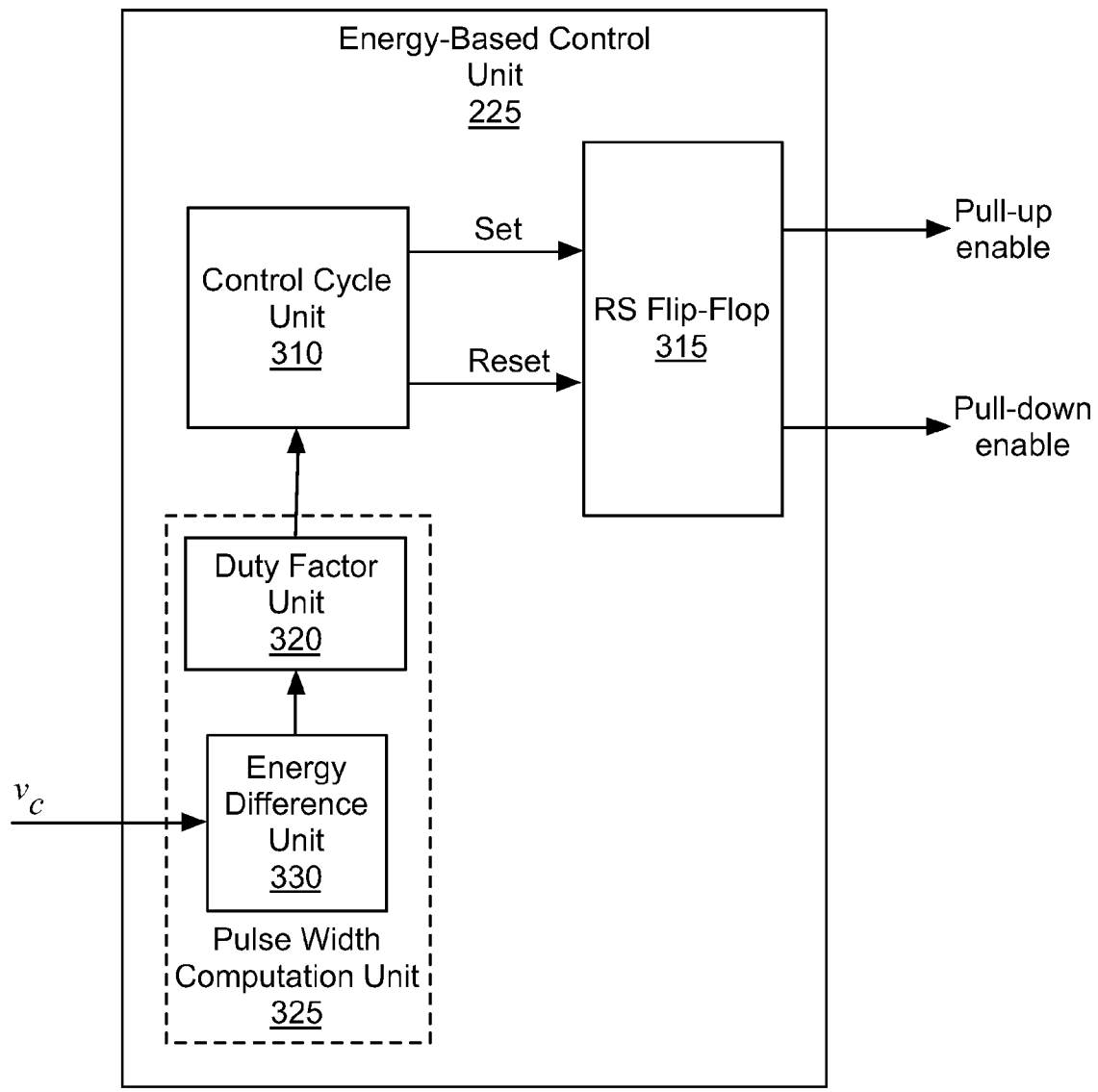
FIG. 3A illustrates the energy-based control unit shown in FIG. 2B, in accordance with one embodiment.

FIG. 3A illustrates the energy-based control unit 225 shown in FIG. 2B, in accordance with one embodiment. The energy-based control unit 225 includes a control cycle unit 310, an RS flip-flop 315, and a pulse width computation unit 325. The control cycle unit 310 generates a set signal that is configured to set the RS flip-flop 315 and a reset signal that is configured to reset the RS flip-flop 315. The RS flip-flop 315 asserts the pull-up enable signal when the set signal transitions high and the pull-up enable signal remains high until the reset signal transitions high. In one embodiment, the pull-down enable signal is an inverted version of the pull-up enable signal with dead time added to ensure that the switching mechanisms M1 and M2 are not simultaneously enabled after accounting for asymmetric turn-on and turn-off delays of the power MOSFETs. The pull-up enable signal may be coupled to the M1 switching mechanism and the pull-down signal may be coupled to the M2 switching mechanism.

The pulse width computation unit 325 is configured to control the duty factor of the control cycle by resetting the RS flip-flop 315 to produce a positive pulse width of $t_p$ for the pull-up enable and a negative pulse width of $t_p$ for the pull-down enable. The pulse width computation unit 325 includes a duty-factor unit 320 and an energy difference unit 330. In one embodiment, the energy difference unit 330 receives the voltage $v_c$ and determines the energy difference based on a difference between $v_c$ and the target voltage $V_T$. To determine the energy in the inductor L, the energy difference unit 330 also receives either the measured current $i_x$ or estimates the current $i_x$ from other variables. For example it may estimate $i_x$ from $dv_c/dt$, the rate of change (or the derivative) of $v_C$. The duty-factor unit 320 computes the duty factor D based on $\Delta E$ or one or more signals representing $\Delta E$.

When C is large, capacitive energy dominates total energy, and the total energy may be estimated from just the capacitive energy $0.5 \, Cv_c^2$. In these cases the duty factor can be computed directly from capacitor voltage $v_{Cap}$. However, when inductive energy has values comparable to the capacitive energy, the calculation of energy deficit should include a term based in $i_x$, which can either be sensed directly or estimated from other variables, for example from the derivative of $v_c$.

Figure 3B:
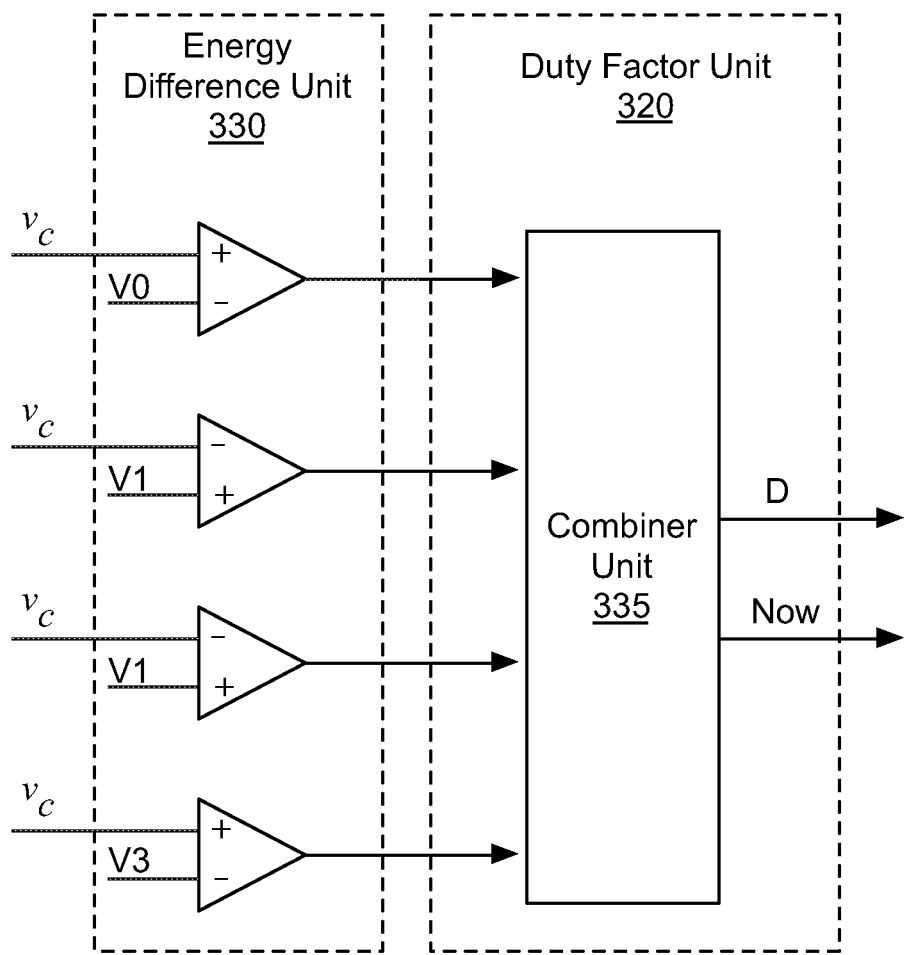
FIG. 3B illustrates the energy difference unit shown in FIG. 3A, in accordance with one embodiment.

FIG. 3B illustrates the energy difference unit 330 shown in FIG. 3A, in accordance with one embodiment. The energy difference unit 330 includes a bank of comparators that each receives a value corresponding to the stored energy in the switching voltage regulator 222 as an input. In one embodiment, the value is the output voltage, $v_c$. Each comparator triggers at a particular energy value corresponding to a pre-determined level (i.e., voltage levels V0, V1, V2, and V3) and the lowest pre-determined level, V0 may correspond to a minimum threshold energy difference $E_{th}$. $\Delta E$ may be estimated as the square of a voltage difference scaled by a constant. However, in the embodiment shown in FIG. 3B, the differences in voltage that are output by the bank of comparators are used instead of computing $\Delta E$. A pre-defined duty factor is associated with each of the comparator outputs. The pre-determined levels may increase from V0 to V3 linearly or non-linearly (e.g., logarithmically or quadratically). For example, the pre-determined levels may be related to the solution of the quadratic equation (8) at energy levels corresponding to different values of $v_c$ assuming typical values of $i_x$. The greatest energy difference is indicated by the greatest difference between $v_c$ and a pre-determined voltage level.

The duty-factor unit 320 includes a combiner unit 335 that receives the comparator outputs from the energy difference unit 330, identifies the triggered output corresponding to the greatest energy difference, and generates a duty factor D. The duty factor corresponds to ΔE, and controls the pulse width during which the pull-up enable signal is asserted at the next control cycle. The control cycle unit 310 receives the duty factor and asserts the reset signal after the set signal is asserted to generate a pulse on the pull-up enable signal that substantially equals the pulse width. In one embodiment, the pulse width computation unit 325 may be configured to immediately apply the pulse by asserting the set signal before the next control cycle when $\Delta E > E_{high}$, to minimize the response time of the energy-based control unit 225. The now signal that is output by the combiner unit 335 indicates that the pulse width should be applied immediately rather than waiting for the next control cycle.

In one embodiment, the duty-factor unit 320 may also be configured to increase the pulse width to provide voltage overshoot to reduce the response time of the switching regulator 222 and reduce voltage drop at the load 230. Solving the quadratic equation (8) gives a duty factor D that will correct a voltage drop with minimum delay and no voltage overshoot. In other words, only the energy difference needed to adjust $v_c$ to the target voltage $V_T$ will be provided by the switching regulator 222. When some overshoot of $v_c$ may be tolerated at the load 230, the correction of $v_c$ may be performed faster. In one embodiment, the duty factor may be computed to perform correction with overshoot when the energy difference exceeds an overshoot threshold $E_{TO}$ (i.e., when $\Delta E > E_{TO}$). When correction is performed with overshoot, the energy difference ΔE is replaced with an inflated energy deficit $\Delta E_O = \Delta E + E_O$, where $E_C$ is the energy associated with an overshoot voltage $V_O$ that can be tolerated.

$$E_O = \frac{C}{2}(V_O^2 - V_T^2)$$

When the duty factor unit 320 computes the duty factor for a higher voltage, the inductor current $i_L$ ramps to a higher value before the reset signal to the RS flip-flop 315 is asserted to disable the pull-up signal (i.e., disable the high-side switching mechanism M1). With the higher current, the output capacitor slews more quickly to correct the voltage drop.

Finally, to avoid overstress on the MOSFETs M1 and M2 and inductor L, the duty factor may be limited to prevent the current $i_L$ from exceeding a maximum current limit value $I_{max\ \square}$. A maximum duty factor, $D_{max}$ may be computed as $$D_{max\square} = \frac{(I_{max} - i_x)L}{(V_S - v_c)}.$$

The duty-factor unit 320 may be configured to limit D to be less than $D_{max}$.

In one embodiment, the duty-factor unit 320 may also be configured to increase the pulse width to compensate for circuit loss of the switching regulator 222. To compensate for switching losses of x percent, the computed ΔE is multiplied by 1/(1−x), so that the duty factor unit 320 computes the duty factor needed to adjust the energy when switching losses are incurred.

Returning to FIG. 3B, when none of the comparators are triggered, the energy difference unit 330 may output a value of D indicating that $\Delta E \leq E_{th}$. In one embodiment, when $\Delta E \leq E_{th}$ the pulse width computation unit 325 may be configured to operate as a PID controller to minimize ripple of $v_c$. While energy-based control is very effective at responding to current transients significantly faster than a PID controller, the energy-based control can result in more voltage and current ripple during steady state conditions compared with PID control schemes. When the energy-based control unit 225 is configured to function as a PID controller during steady state conditions, a low steady-state ripple of $v_c$ is achieved while also having a fast response to transients that is characteristic of the energy-based control technique. However, when switching between the energy-based control and the PID control, care must be used to avoid integral wind-up in the PID control circuitry. In one embodiment, energy-based control unit 225 is configured to use energy-based control when the energy difference is larger than 100 μJ and otherwise use a conventional control scheme, such as PID.

Although the pulse width computation unit 325 has been described in conjunction with FIG. 3B as being implemented using comparators, other implementations are possible. For example, the energy difference unit 330 shown in FIG. 3B may receive the computed stored energy $E_R$ in place of $V_C$ and compare the stored energy to different pre-determined energy values instead of pre-determined voltage values.

Figure 3C:
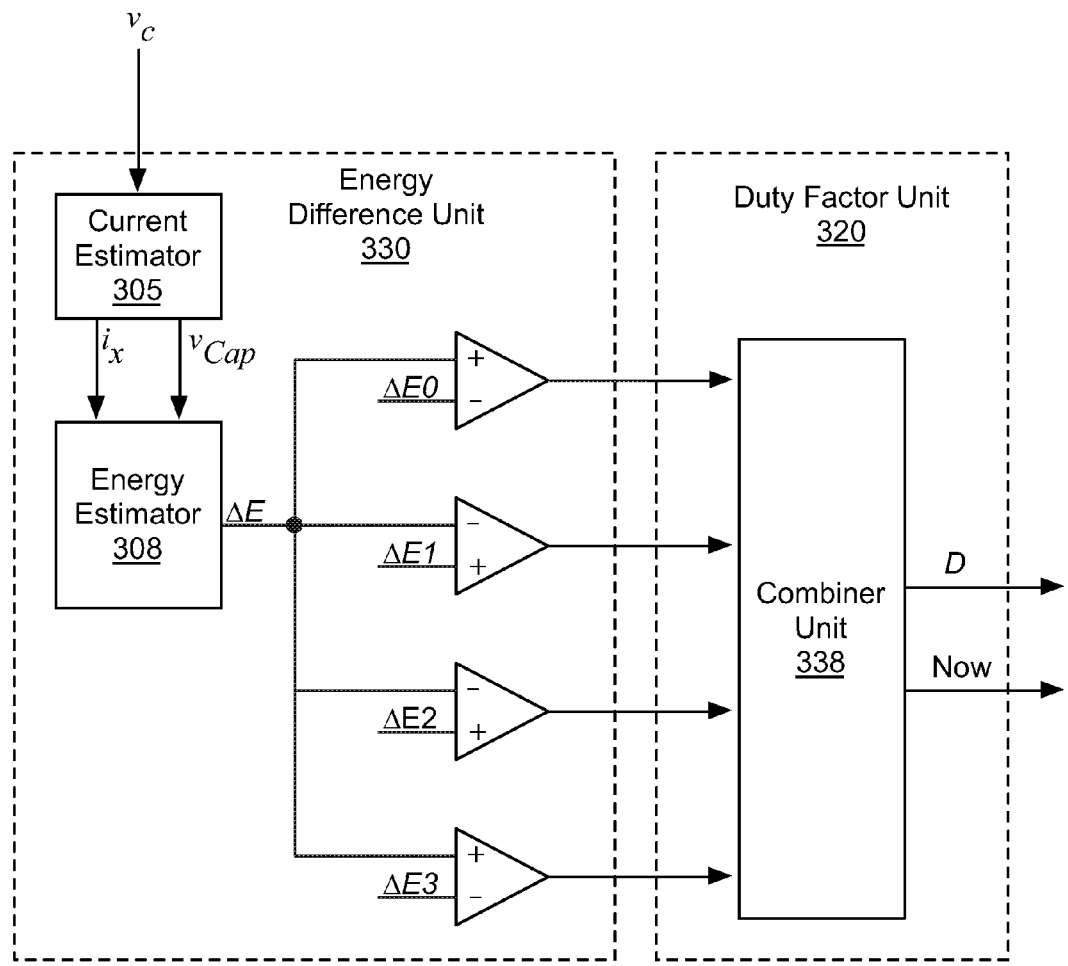
FIG. 3C illustrates the energy difference unit and duty factor unit shown in FIG. 3A, in accordance with another embodiment.

FIG. 3C illustrates the energy difference unit 330 shown in FIG. 3A, in accordance with another embodiment. As shown in FIG. 3C, the energy difference unit 330 includes a current estimator 305 and an energy estimator 308. The current estimator 305 receives the output voltage, $v_c$ and computes an estimate of the instantaneous current $i_x$. Alternatively, $i_x$ may be sensed and received as an input to the energy estimator 308. The current estimator 305 outputs the instantaneous current $i_x$ and the computed $v_{Cap}$ value to the energy estimator 308. The energy estimator 308 may be configured to solve equation (8) to compute ΔE, using in place of $v_c$.

The energy difference unit 330 includes a bank of comparators that each receives ΔE as an input. Each comparator triggers at a particular energy value corresponding to a pre-determined level (i.e., energy difference levels ΔE0, ΔE1, ΔE2, and ΔE3) and the lowest pre-determined level, ΔE0 may correspond to a minimum threshold energy difference $E_{th}$. ΔE may be estimated as the square of a voltage difference scaled by a constant. A pre-defined duty factor, D, is associated with each of the comparator outputs. The pre-determined levels may increase from ΔE0 to ΔE3 linearly or non-linearly (e.g., logarithmically). For example, the pre-determined levels may be related to the solution of the quadratic equation (8) at energy levels. The greatest energy difference is indicated by the greatest difference between ΔE and a pre-determined energy difference level.

The duty-factor unit 320 includes a combiner unit 338 that receives the comparator outputs from the energy difference unit 330, identifies the triggered output corresponding to the greatest energy difference, and generates a duty factor D, as previously described in conjunction with FIG. 3B. The now signal that is output by the combiner unit 335 indicates that the pulse width should be applied immediately rather than waiting for the next control cycle. The duty factor unit 320 may also be configured to implement overshoot and/or to account for losses.

Figure 3D:
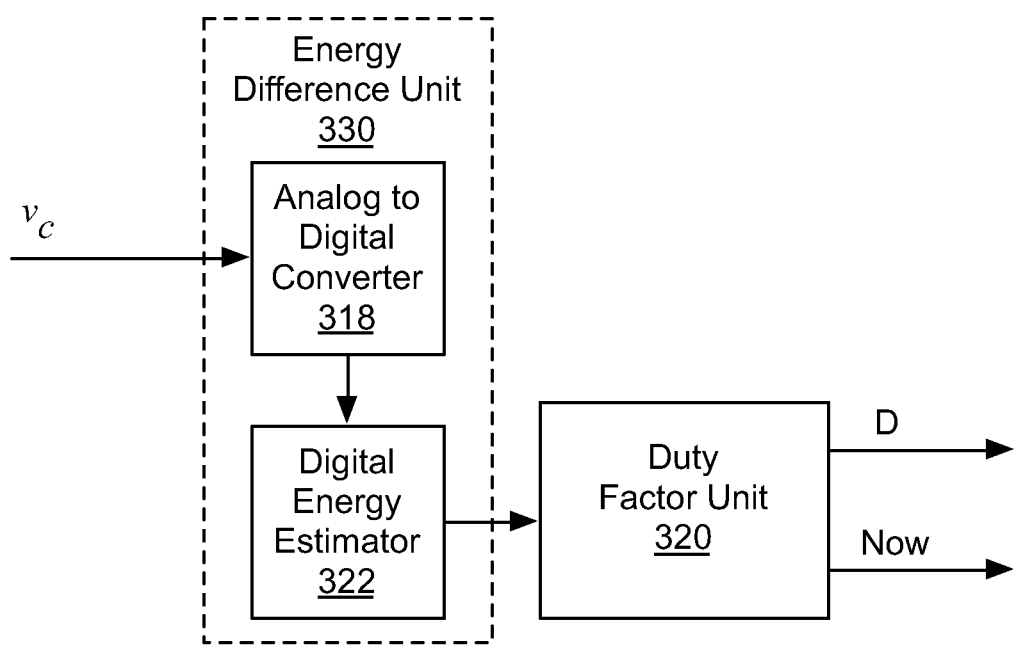
FIG. 3D illustrates the energy difference unit and duty factor unit shown in FIG. 3A, in accordance with another embodiment.

FIG. 3D illustrates the energy difference unit 330 shown in FIG. 3A, in accordance with another embodiment. As shown in FIG. 3D, the pulse width computation unit 325 is implemented using an analog to digital (A/D) converter 318. The A/D converter is configured to sample the voltage $V_C$ once per sample period (which should be at least as fast as the control cycle) and output the sampled voltage as a digital value. A digital energy estimator 322 may be implemented as fixed function logic circuitry or a digital signal processor (DSP) that is configured to compute energy difference based on the sampled voltage and either the measured current $i_x$ or the derivative of the sampled voltage to estimate $i_x$. The derivative of $i_x$ may be estimated from the difference in $i_x$ over one or more sample periods. In one embodiment, the digital energy estimator 322 determines a representation of the energy difference based on a difference between v, and the target voltage $V_T$. In another embodiment the digital energy estimator computes the energy difference from equations (1-3), using both $i_x$ and $v_c$. The duty-factor unit 320 computes the duty factor D based on $\Delta E$ or one or more signals representing $\Delta E$.

In one embodiment, if the energy difference exceeds a threshold (i.e., $E_{th}$), the duty-factor unit 320 solves the quadratic equation (8) to compute the pulse width and corresponding duty factor. In one embodiment, the A/D converter is implemented with 10 bits of precision and the calculation of duty factor is carried out to 10 bits of precision. The DSP may also be configured to implement overshoot, to account for losses, and to apply the pulse width immediately or to apply the pulse width at the next control cycle.

The computation of the pulse width and corresponding duty factor may be simplified further by pre-computing the duty factor response for several pre-determined voltage or energy values. For example, duty factors may be stored in a lookup table for each of 64 evenly spaced A/D pre-determined voltage or energy values. Linear or some other interpolation may be employed to compute a duty factor between any two duty factors read from the lookup table, where the two duty factors correspond to the two pre-determined voltage values closest to the sampled voltage value or the two pre-determined energy values closest to an energy value computed using the sampled voltage value. For example, high bits of the sampled voltage value may be used to read the two duty factors from the lookup table and low bits of the sampled voltage value may be used to interpolate between the two duty factors that are read from the table.

Figure 3E:
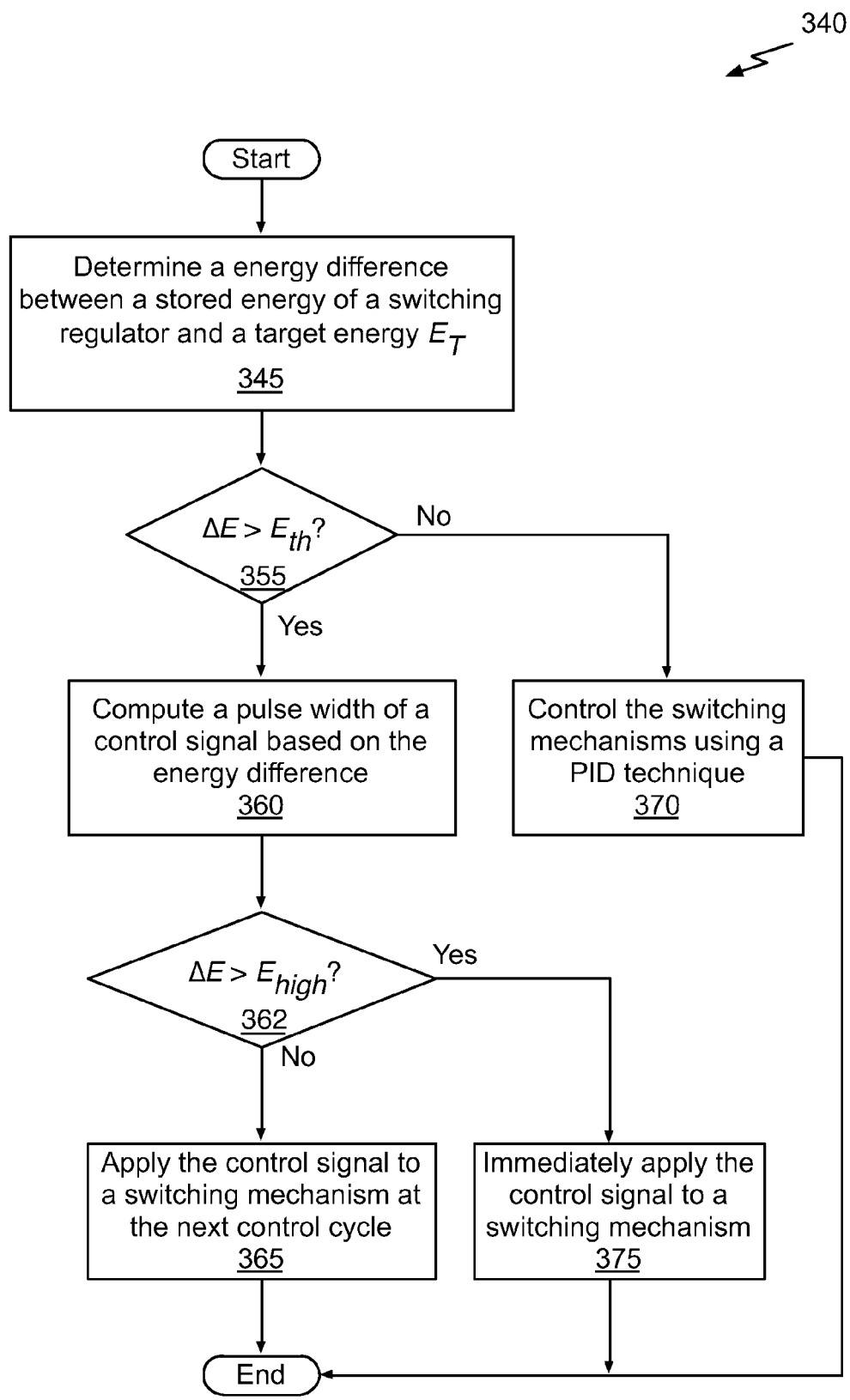
FIG. 3E illustrates a flowchart of another method for energy-based control of a switched regulator, in accordance with one embodiment.

FIG. 3E illustrates a flowchart of another method 340 for energy-based control of a switched regulator, in accordance with one embodiment. Although the method 340 is described in the context of the energy-based control unit 225, the method 340 may also be performed by custom circuitry or by a combination of custom circuitry and a program. At step 345, the energy-based control unit 225 determines an energy difference between a stored energy of a switching voltage regulator and a target energy. At step 355, the energy-based control unit 225 determines if the energy difference is greater than a minimum threshold energy difference, and, if not, at step 370 the energy-based control unit 225 controls the switching mechanisms using a PID technique and terminates.

Otherwise, at step 360, the energy-based control unit 225 computes a pulse width of a control signal based on the energy difference. At step 362, the energy-based control unit 225 determines if the energy difference is greater than a high threshold energy difference, and, if so, at step 375 the energy-based control unit 225 immediately applies the control signal to the current control mechanism of the switching voltage regulator 222 without waiting for the start of the next control cycle. Otherwise, at step 365, the energy-based control unit 225 applies the control signal to the current control mechanism of the switching voltage regulator 222 at the next control cycle.

Figure 3F:
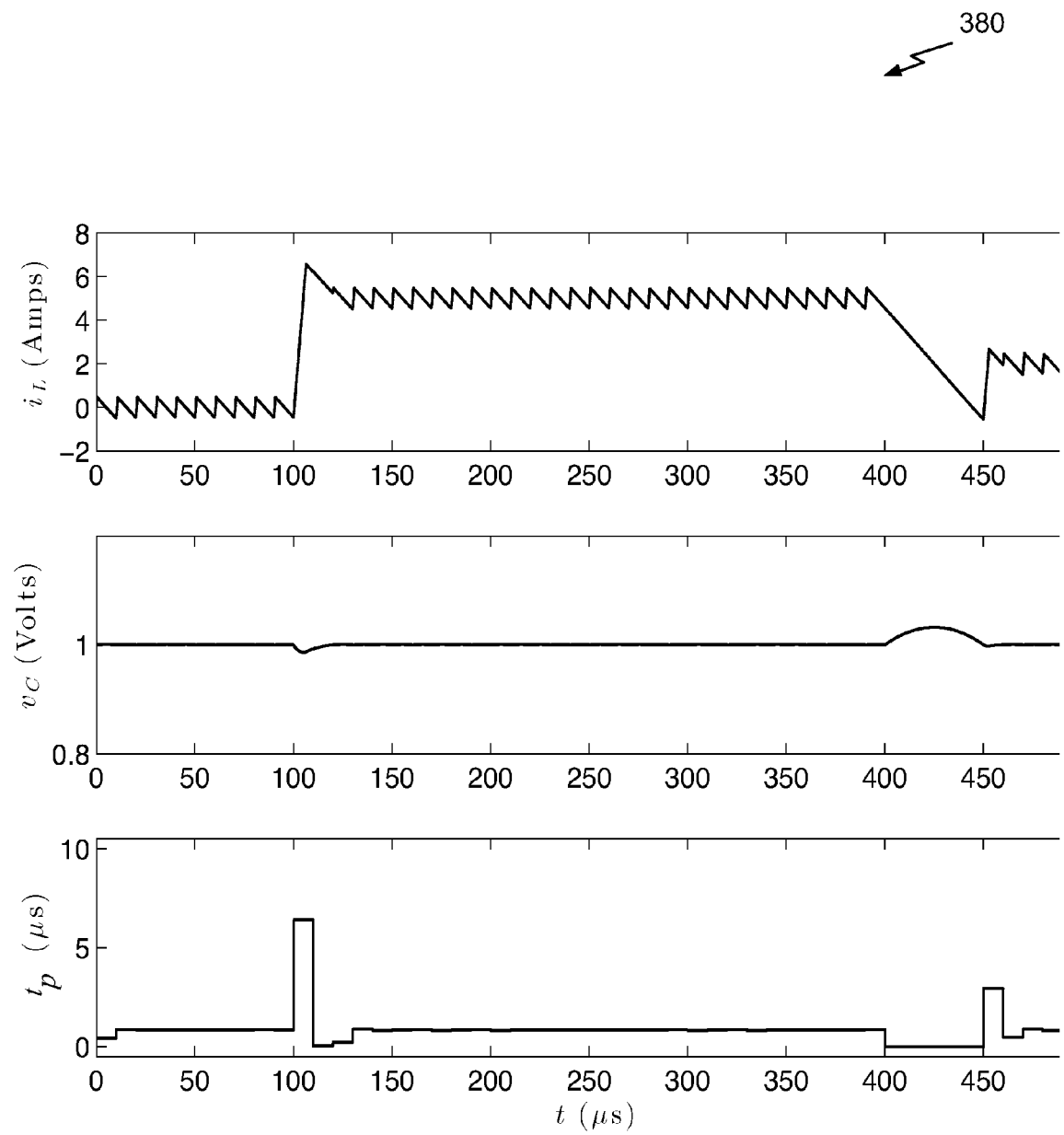
FIG. 3F illustrates voltage and current waveforms showing energy-based control of the switching regulator shown in FIG. 2B using the method shown in FIG. 3C, in accordance with one embodiment.

FIG. 3F illustrates voltage and current waveforms 380 showing energy-based control of the switching regulator 222 shown in FIG. 2B using the method shown in FIG. 3C, in accordance with one embodiment. A first waveform corresponds to the current $i_L$ at the load 230. A second waveform corresponds to the voltage $v_c$ at the filter capacitor C. A third waveform corresponds to the width of the pulse $t_a$ during which the high-side switching mechanism M1 is enabled by the energy-based control unit 225. The energy-based control unit 225 responds to current transients on $i_L$ of +5 Amps at 100 μs and −3 Amps at 400 μs by increasing $t_a$. When the energy difference exceeds a high threshold energy difference, $E_{high}$, the pulse width may be applied immediately rather than waiting for the start of the next control cycle. As FIG. 3F shows, the energy-based control unit 225 generates signals that control the current control mechanism to correct an energy deficit in a single control cycle when the energy difference exceeds a minimum threshold energy difference, $E_{th}$. Otherwise, the energy-based control unit 225 generates signals according to a PID technique to maintain a low ripple in $v_C$. The energy-based control unit 225 used to generate the waveforms 380 is configured with $E_{th}$=10 μJ.

Figure 4:
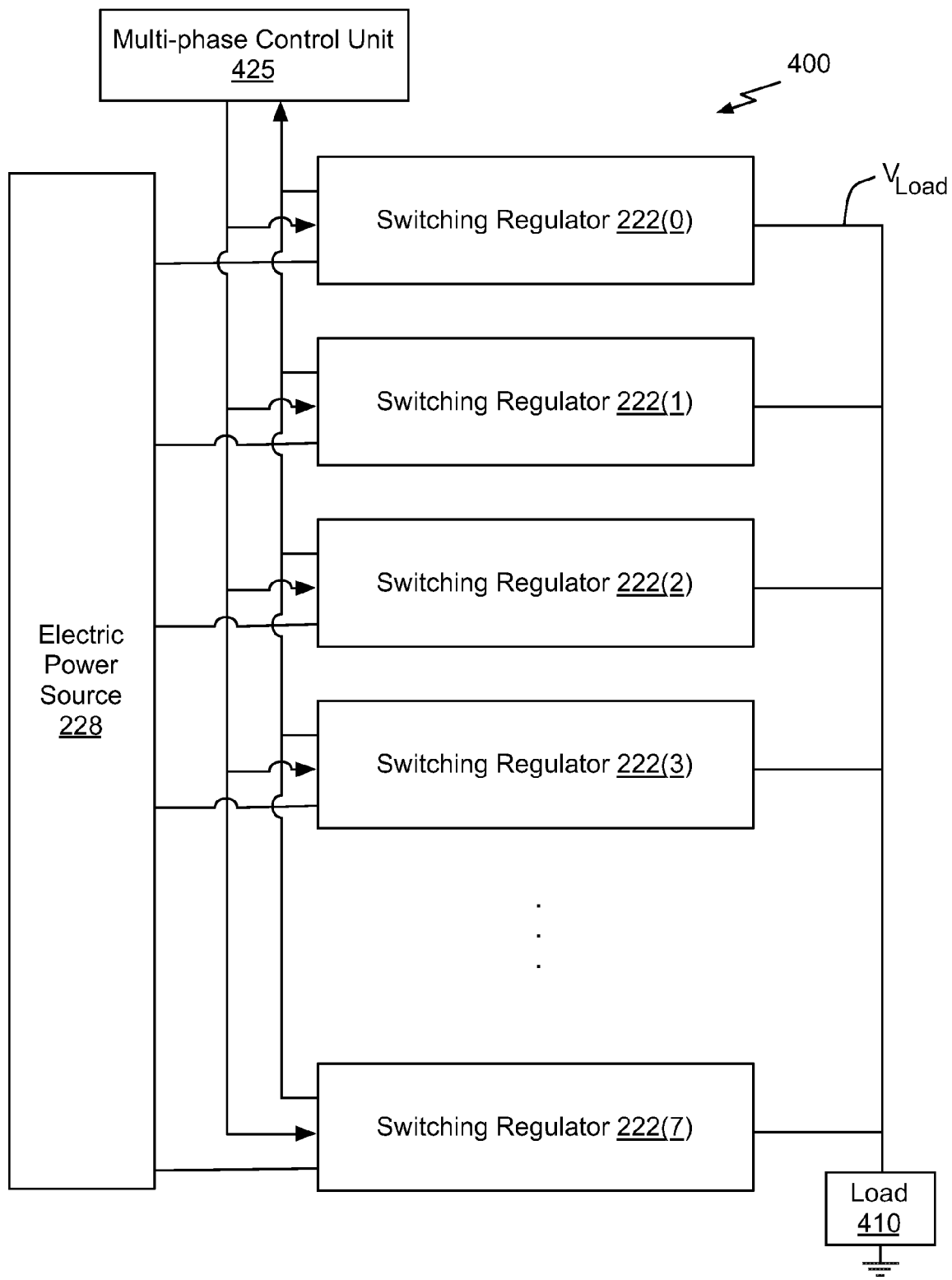
FIG. 4 illustrates a multi-phase switching regulator that includes a multi-phase control unit and switching regulators, in accordance with one embodiment.

FIG. 4 illustrates a multi-phase switching regulator 400 that includes a multi-phase control unit 425 and switching regulators 222, in accordance with one embodiment. Each of the switching regulators 222 is one phase of an eight-phase switching regulator. In one embodiment, each switching regulator 222 is configured to provide a desired output voltage level ($V_L$) at the load 410 by converting power received from an electric power source 228 for one phase of the eight phases. A single controller, shown as the multi-phase control unit 425, may be used to control each of the switching regulators 222. The multi-phase control unit 425 is configured to receive information from the energy-based control unit 225 within each switching regulator 222 and to configure each switching regulator 222 to generate the total energy that is provided to the load 410. In another embodiment, the functionality of the dedicated energy-based control unit 225 within each switching regulator 222 is incorporated into the multi-phase control unit 425.

A single filter capacitor C1, or parallel combination of filter capacitors, may be shared by the different electric power conversion devices 228 rather than including a filter capacitor C1 in each of the switching regulator 222. Additionally, one or more of switching regulators 222 may be replaced with a conventional regulator circuit.

At any point in time, the multi-phase control unit 425 has a target voltage $V_T$ that needs to be delivered to the load 410. The different phases (i.e., switching regulators 222) of the multi-phase switching regulator 400 are configured to generate a total energy to maintain $V_C$ at $V_T$. With the total energy being delivered in a single control cycle. One or more of the switching mechanisms within each phase is configured to generate at least a portion of the total energy. To respond with minimum delay, for small energy deficits, the pulse width of the next phase to switch is adjusted to completely correct the energy deficit. At larger deficits, larger than can be corrected by one phase without exceeding a current limit, the pulse width of the next one or more phases to switch are adjusted. For even larger deficits one or more phases are switched on immediately—out of their normal sequence. For the largest deficits, when an energy transient exceeds the high threshold $E_{high}$, the pull-up enables of all phases may be simultaneously asserted.

Figure 5:
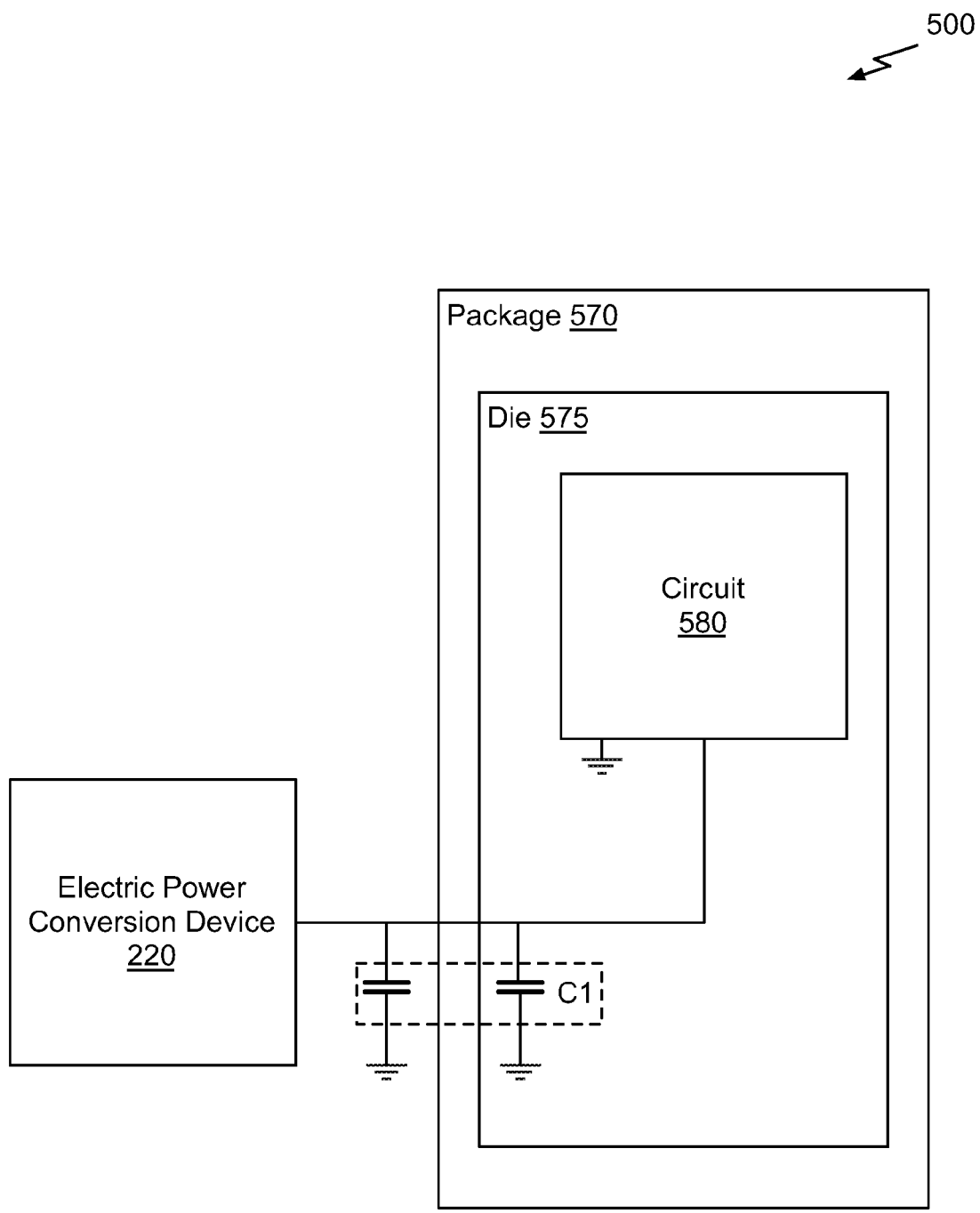
FIG. 5 illustrates a diagram of the energy-based controlled switching regulator within a system, according to one embodiment.

FIG. 5 illustrates a system 500 including an electric power conversion device 220 implemented using an energy-based switching regulator 222, according to one embodiment. In another embodiment, the electric power conversion device 220 is replaced with the multi-phase energy-based switching regulator 400. The inductor is coupled to the filter capacitor C1. The filter capacitor C1 may be implemented as a parallel combination of filter capacitors where a large capacitor is used outside of the package 570 (i.e., on a printed circuit board) and a smaller capacitor is used within the package 570 and/or on the die 575. The pulse width and corresponding duty factor of the energy-based switching regulator 222 is adjusted as needed to regulate the voltage level at the load, i.e., circuit 580.

Figure 6:
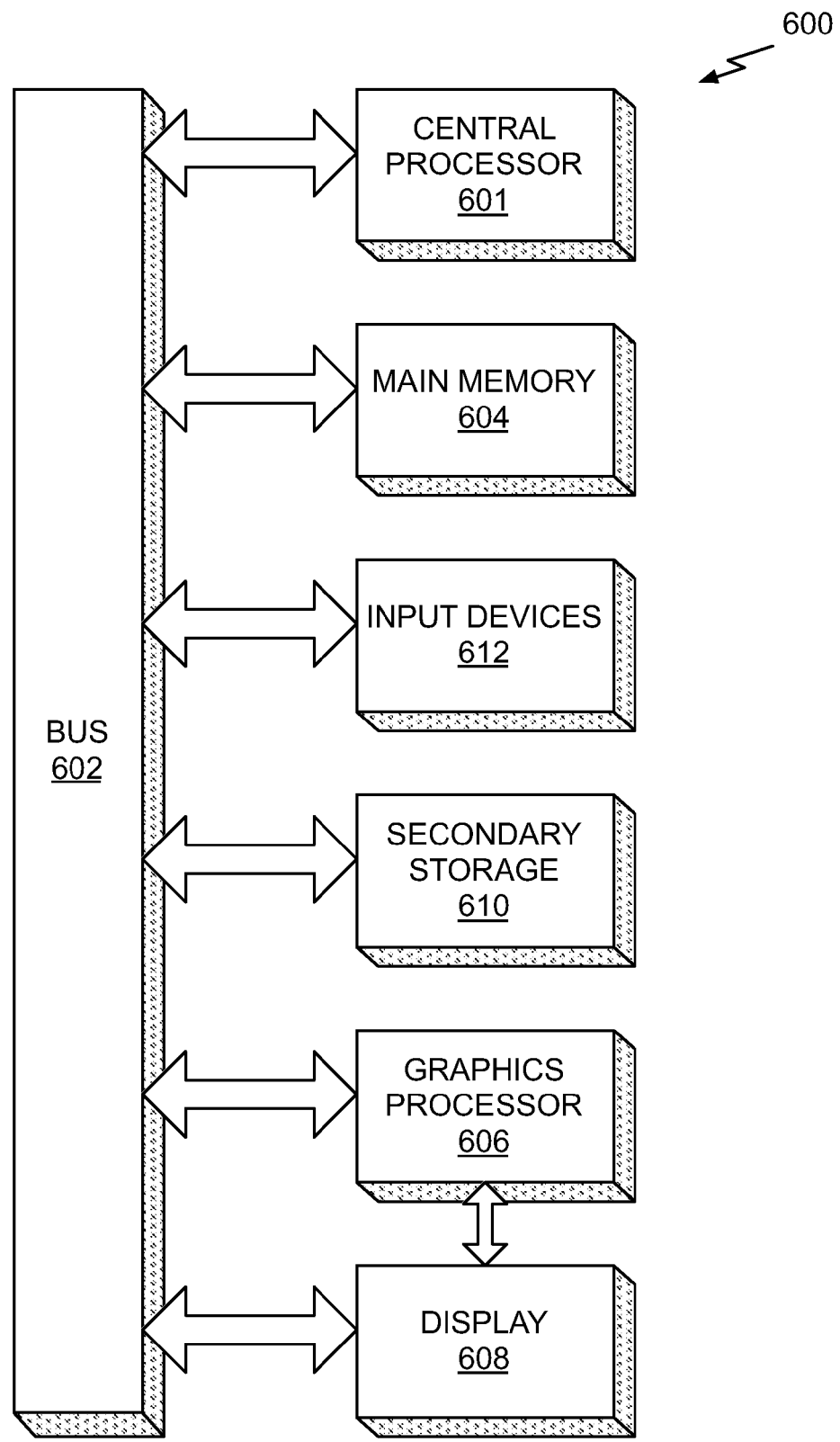
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one central processor 601 that is connected to a communication bus 602. The communication bus 602 may be implemented using any suitable protocol, such as PCI (Peripheral Component Interconnect), PCI-Express, AGP (Accelerated Graphics Port), HyperTransport, or any other bus or point-to-point communication protocol(s). The system 600 also includes a main memory 604. Control logic (software) and data are stored in the main memory 604 which may take the form of random access memory (RAM).

The system 600 also includes input devices 612, a graphics processor 606, and a display 608, i.e. a conventional CRT (cathode ray tube), LCD (liquid crystal display), LED (light emitting diode), plasma display or the like. User input may be received from the input devices 612, e.g., keyboard, mouse, touchpad, microphone, and the like. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user. One or more of the systems 500 shown in FIG. 5, may be incorporated in the system 600 to provide power to one or more of the chips.

The system 600 may also include a secondary storage 610. The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner. Computer programs, or computer control logic algorithms, may be stored in the main memory 604 and/or the secondary storage 610. Such computer programs, when executed, enable the system 600 to perform various functions. The main memory 604, the storage 610, and/or any other storage are possible examples of computer-readable media.

In one embodiment, the architecture and/or functionality of the various previous figures may be implemented in the context of the central processor 601, the graphics processor 606, an integrated circuit (not shown) that is capable of at least a portion of the capabilities of both the central processor 601 and the graphics processor 606, a chipset (i.e., a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, laptop computer, server, workstation, game consoles, embedded system, and/or any other type of logic. Still yet, the system 600 may take the form of various other devices including, but not limited to a personal digital assistant (PDA) device, a mobile phone device, a television, etc.

Further, while not shown, the system 600 may be coupled to a network (e.g., a telecommunications network, local area network (LAN), wireless network, wide area network (WAN) such as the Internet, peer-to-peer network, cable network, or the like) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   determining, via an energy difference unit, an energy difference between a stored energy of a switching voltage regulator and a target energy;
   computing a control variable of the switching voltage regulator based on the energy difference; and
   applying the control variable to a current control mechanism of the switching voltage regulator,
   wherein the stored energy includes energy stored in an inductor of the switching voltage regulator and energy stored in a capacitor of the switching voltage regulator,
   wherein the energy difference unit determines the energy stored in the capacitor based on a sensed voltage across the capacitor and determines the energy stored in the inductor based on an excess inductor current, and
   wherein the target energy includes energy stored in the capacitor when an output voltage is equal to a target output voltage with zero excess inductor current.

2. The method of claim 1, wherein the control variable is a duty factor for a pulse width modulation (PWM) signal.

3. The method of claim 1, wherein the control variable is a duty factor for a pulse width modulation (PWM) signal that selectively enables and disables a pull-up switching mechanism that is coupled between an upstream end of the inductor and an electric power source and a pull-down switching mechanism that is coupled between the upstream end of the inductor and ground.

4. The method of claim 1, wherein the control variable is applied immediately after determining that the energy difference exceeds a high threshold energy difference.

5. The method of claim 1, wherein the control variable is applied at a next control cycle after determining that the energy difference does not exceed a high threshold energy difference.

6. The method of claim 1, further comprising determining that the energy difference exceeds a minimum energy threshold.

7. The method of claim 2, further comprising increasing the duty factor to compensate for circuit loss of the switching voltage regulator.

8. The method of claim 2, further comprising increasing the duty factor to provide voltage overshoot.

9. The method of claim 1, wherein the control variable is computed based on a maximum current limit.

10. The method of claim 1, wherein computing the control variable comprises solving a quadratic equation using the energy difference as an input.

11. The method of claim 10, further comprising measuring the excess inductor current and using the measured excess inductor current as an input to the quadratic equation.

12. The method of claim 10, further comprising estimating the excess inductor current based on a derivative of the sensed voltage and using the estimated excess inductor current as an input to the quadratic equation.

13. The method of claim 1, wherein computing the control variable comprises interpolating between two values.

14. The method of claim 1, wherein determining the energy difference comprises comparing a value corresponding to the stored energy to a set of pre-determined levels.

15. The method of claim 1, wherein determining the energy difference comprises converting the sensed voltage to a digital value.

16. The method of claim 1, wherein the switching voltage regulator corresponds to a first phase of a multi-phase switching voltage regulator, and further comprising applying the control variable to a second current control mechanism of a second switching voltage regulator that is configured as a second phase of the multi-phase switching voltage regulator.

17. A switching voltage regulator circuit, comprising:
a pull-up switching mechanism;
a pull-down switching mechanism that is coupled to the pull-up switching mechanism;
an inductor having an upstream end that is coupled to a common node between the pull-up switching mechanism and the pull-down switching mechanism;
a capacitor that is coupled to the downstream end of the inductor; and
an energy-based control circuit that is coupled to the pull-up switching mechanism and the pull-down switching mechanism, the energy-based control circuit configured to:
  determine an energy difference between a stored energy of the switching voltage regulator and a target energy;
  compute a control variable based on the energy difference; and
  apply the control variable to the pull-up switching mechanism,
wherein the stored energy includes energy stored in the inductor and energy stored in the capacitor,
wherein the energy-based control circuit includes an energy difference unit configured to determine the energy stored in the capacitor based on a sensed voltage across the capacitor and determine the energy stored in the inductor based on an excess inductor current, and
wherein the target energy includes energy stored in the capacitor when an output voltage is equal to a target output voltage with zero excess inductor current.

18. The switching voltage regulator circuit of claim 17, wherein the control variable is a duty factor for a pulse width modulation (PWM) signal.

19. The switching voltage regulator circuit of claim 17, wherein the control variable is a duty factor for a pulse width modulation (PWM) signal that selectively enables and disables the pull-up switching mechanism that is coupled between the upstream end of the inductor and an electric power source and the pull-down switching mechanism that is coupled between the upstream end of the inductor and ground.

20. The method of claim 1, wherein the energy difference unit is coupled to a duty factor unit configured to compute the control variable, and wherein applying the control variable to the current control mechanism is implemented using an RS flip-flop.

* * * * *